Feb. 25, 1930.
R. E. POWELL
RESISTANCE WELDING ELECTRODE
Re. 17,604
Original Filed May 22, 1926
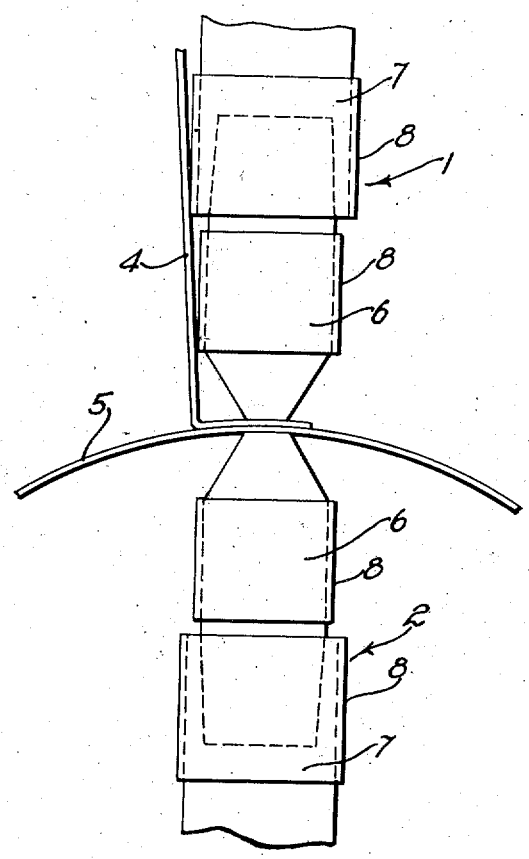
Inventor
Raymond E. Powell
by H. A. Parrison Att'y Reissued Feb. 25, 1930 Re. 17,604

UNITED STATES PATENT OFFICE

RAYMOND EUGENE POWELL, OF WESTFIELD, NEW JERSEY, ASSIGNOR TO WESTERN ELECTRIC COMPANY, INCORPORATED, OF NEW YORK, N. Y., A CORPORATION OF NEW YORK

RESISTANCE WELDING ELECTRODE

Original No. 1,673,020, dated June 12, 1928, Serial No. 110,905, filed May 22, 1926. Application for reissue filed April 22, 1929. Serial No. 357,263.

This invention relates to welding apparatus, and more particularly to electrodes and electrode holders for use in electrical resistance welding.

In some instances in welding by the electrical resistance method, parts to be welded are so designed and proportioned as to render it difficult to produce a weld in the desired position without causing contacts between the parts and the electrode or holder therefor at points other than the location of the weld. These additional contacts may result in the fusing of the work at these points as well as cause a diversion of a sufficient amount of the welding current from the tip of the electrode to materially reduce the effectiveness of the welding operation.

An object of the invention is to provide a simplified apparatus for electrically welding parts wherein the current conducting portions are electrically insulated from the parts except at the position of the weld.

In accordance with one embodiment of the invention, the electrode and the holder therefor are each surrounded by a band of steel which has been treated with a solution of phosphoric acid, changing the surface of the steel to a dull black phosphate of iron which is a good electric insulator under the severe temperature and other conditions encountered in welding.

It is believed that a complete understanding of the invention may be had by reference to the following description taken in conjunction with the accompanying drawing which illustrates one embodiment of the invention.

The drawing illustrates the application of electrode units 1 and 2 to the welding of parts of a wall assembly for a loading coil case, such as is used extensively in telephone transmission circuits, in which an angularly shaped piece 4 is welded to a cylindrical surface 5. The welding current in a resistance welding process in some cases is regulated to the exact amount required to produce a weld in the material between the electrodes. If therefore, the lateral surfaces of the electrode or its holder come in contact with the work, some of the current will be diverted and there may be insufficient current flowing from the tips of the electrodes through the parts to be welded to form an entirely satisfactory weld. According to the present invention, copper electrodes 6 and electrode holders 7 of any usual type and associated with a suitable electrical welding circuit (not shown), are surrounded by steel bands or jackets 8 which have been previously treated in a solution of phosphoric acid changing the surface of the steel to a dull black phosphate of iron, thus forming a layer of electrical insulating material on the surfaces of the steel band. Thus the bands which preferably are pressed over the electrodes and the holders form an insulating sheath around these parts preventing a diversion of the welding current through contact with the work and a consequent loss of energy and fusion of the electrode or holder to the work, and insure a sufficient amount of welding current passing through the parts to be welded to form a good weld.

It will be understood that the embodiment of the invention herein described and illustrated is merely a useful and convenient form of the invention, which is capable of many other modifications without departing from the spirit and scope of the invention.

What is claimed is:

1. An electrode unit for electric welding, comprising an electrode provided with an insulating jacket having a coating of phosphate of iron, and an electrode holder provided with an insulating jacket having a coating of phosphate of iron.

2. An electrode unit for electric welding comprising an electrode surrounded by a band of steel having a phosphate of iron surface, and an electrode holder surrounded by a band of steel having a phosphate of iron surface.

3. In an electrode unit for electric welding an electrode having an insulating material of phosphate of iron on a surface thereof.

4. In an electrode unit for electric welding an electrode provided with an insulating jacket having a coating of phosphate of iron.

5. In an electrode unit for electric welding an electrode surrounded by a band of steel having a phosphate of iron surface.

6. An electrical current-carrying member having an insulating coating of phosphate of iron.

7. In combination, a member designed to conduct electrical current, and an insulating coating of phosphate of iron on a surface of the member.

8. An electrical current-carrying member, and a ferrous member attached thereto and having a coating of phosphate of iron to provide an insulation for the current-carrying member.

9. An electrical current-carrying member, and a protective member surrounding the first mentioned member and having a coating of phosphate of iron thereon.

10. An electrical conductor designed to carry heavy electrical currents, at least a portion of the conductor being formed of ferrous metal, and an autogenous coating of iron phosphate formed on said portion.

11. An electrical conductor designed to carry heavy electrical currents and to be subjected to high temperatures during use, and an insulating coating of iron phosphate on the conductor.

12. In electrical apparatus, a member formed of electrically conductive ferrous material and having an autogenous insulating coating of iron phosphate thereon.

13. In electrical apparatus, a member formed of electrically conductive material and having an insulating coating of iron phosphate thereon.

In witness whereof, I hereunto subscribe my name this 15th day of April, A. D. 1929.

RAYMOND EUGENE POWELL.